Patented Jan. 30, 1923.

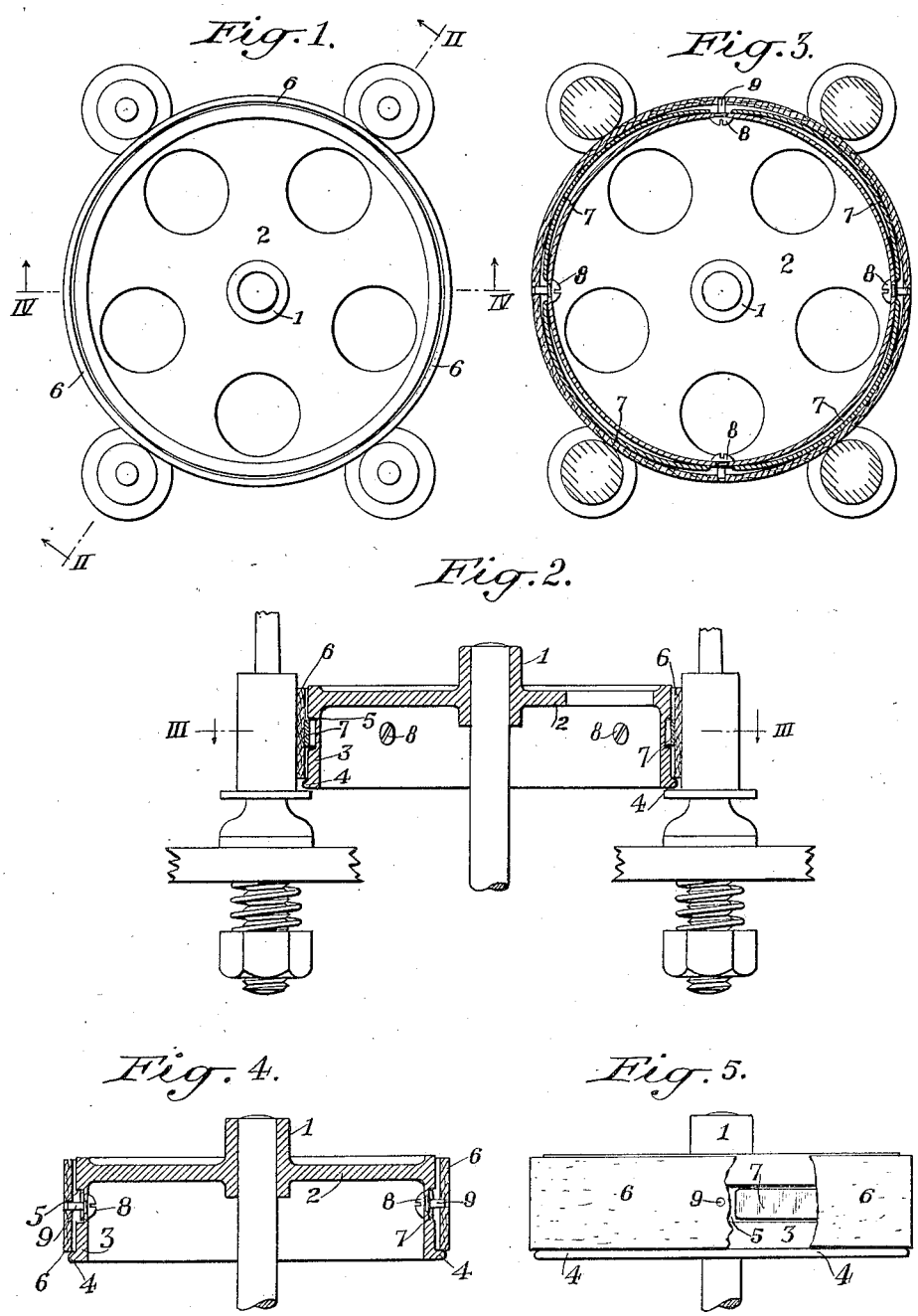

1,443,337

UNITED STATES PATENT OFFICE.

EUGENE ATWOOD, OF STONINGTON, CONNECTICUT, ASSIGNOR TO ATWOOD MACHINE COMPANY, OF STONINGTON, CONNECTICUT, A CORPORATION OF NEW JERSEY.

DRIVING MECHANISM FOR SPINDLES.

Application filed August 27, 1921. Serial No. 496,062.

*To all whom it may concern:*

Be it known that I, EUGENE ATWOOD, a citizen of the United States, and resident of Stonington, in the county of New London and State of Connecticut, have invented a new and useful Improvement in Driving Mechanism for Spindles, of which the following is a specification.

The object of my invention is to provide a pulley with a flexible friction driving surface so that the liability to pound the spindle or other driven element will be eliminated. My invention comprises a pulley having a loose flexible encircling band and weights located between the band and pulley and operated by centrifugal action to yieldingly hold the band in its expanded friction driving position; means being preferably employed for holding the band and weights from shifting with respect to the pulley.

A practical embodiment of my invention is represented in the accompanying drawings, in which—

Fig. 1 represents, in top plan, one of my improved friction driving pulleys in connection with four driven spindles.

Fig. 2 represents a section taken in the plane of the line II—II of Fig. 1, looking in the direction of the arrows.

Fig. 3 represents a section taken in the plane of the line III—III of Fig. 2, looking in the direction of the arrows.

Fig. 4 represents a section taken in the plane of the line IV—IV of Fig. 1, looking in the direction of the arrows, and Fig. 5 represents a side view of the pulley, the portion of the flexible friction driving band being broken away to show the parts beneath the same.

The friction driving pulley comprises the hub 1, web 2 and peripheral portion 3. The peripheral portion may be provided with a circumferential flange 4 and also with a circumferential groove 5.

A flexible band 6 loosely encircles the periphery of the pulley, which band may be made of any suitable material such, for instance, as leather.

A plurality of weights 7 are located between the loose flexible band 6 and the periphery of the pulley, which weights are acted upon by centrifugal action to yieldingly hold the band expanded. In the present instance, these weights are shown as segments having a sharper curve than the pulley, with their ends loosely positioned in the circumferential groove 5 and their intermediate portions engaging the inner wall of the flexible band 6. This circumferential groove serves to prevent the shifting of the weights laterally with respect to the pulley.

A common means is provided for preventing the circumferential shifting of the weights and also the circumferential and lateral shifting of the driving band with respect to the pulley, which means is herein shown as a series of abutments formed by screws 8 having a threaded engagement with the peripheral portion 3 of the pulley and provided with shanks 9 which project between adjacent ends of two weights into holes provided in the encircling band.

When the pulley is rotated at the predetermined speed, the weights 7 will be thrown out by centrifugal action against the inner wall of the flexible driving band to expand the band into its driving position. The band in its expanded condition will yieldingly engage the spindle or other driven element and thus eliminate a pounding action thereon which is liable to happen where the band is rigidly mounted on the pulley.

While I have described my invention in connection with a driving pulley for spindles, it is to be understood that I wish to cover the same for any purpose where such a type of pulley would be useful.

It is evident that the number and shape of the weights may be varied without departing from the spirit and scope of my invention and that various changes may be resorted to in the construction, form and arrangement of the several parts; hence I do not wish to limit myself to the particular embodiment herein shown and described; but

What I claim is:

1. A friction driving pulley having a loose flexible encircling band and means adapted to be acted upon by centrifugal action for holding the band expanded.

2. A friction driving pulley having a loose flexible encircling band and a plurality of weights located between the band and pulley, adapted to be acted upon by centrifugal action to yieldingly hold the band expanded.

3. A friction driving pulley having a loose flexible encircling band, weights located between the band and pulley, adapted to be acted upon by centrifugal action to yieldingly hold the band expanded, and means for preventing the shifting of the weights laterally on the pulley.

4. A friction driving pulley having a loose flexible encircling band, weights located between the band and pulley, adapted to be acted upon by centrifugal action to yieldingly hold the band expanded, and means for preventing the shifting of the weights laterally on the pulley, including a circumferential groove in the pulley within which the weights are seated.

5. A friction driving pulley having a loose flexible encircling band, weights located between the band and pulley, adapted to be acted upon by centrifugal action to yieldingly hold the band expanded, and means for preventing the shifting of the weights circumferentially.

6. A friction driving pulley having a loose flexible encircling band, weights located between the band and pulley, adapted to be acted upon by centrifugal action to yieldingly hold the band expanded, and means for preventing the shifting of the weights circumferentially, including one or more abutments projecting from the periphery of the pulley.

7. A friction driving pulley having a loose flexible encircling band, weights located between the band and pulley, adapted to be acted upon by centrifugal action to yieldingly hold the band expanded, and means for preventing the shifting of the weights laterally and circumferentially.

8. A friction driving pulley having a loose flexible encircling band, weights located between the band and pulley, adapted to be acted upon by centrifugal action to yieldingly hold the band expanded, and means for preventing the shifting of the weights laterally and circumferentially, including a circumferential groove in the pulley within which the weights are seated, and one or more abutments projecting from the periphery of the pulley.

9. A friction driving pulley having a loose flexible encircling band, weights located between the band and pulley, adapted to be acted upon by centrifugal action to yieldingly hold the band expanded, and means for preventing the shifting of the band on the pulley.

10. A friction driving pulley having a loose flexible encircling band, weights located between the band and pulley, adapted to be acted upon by centrifugal action to yieldingly hold the band expanded, and means for preventing the shifting of the band on the pulley comprising one or more abutments projecting from the periphery of the pulley into the band.

11. A friction driving pulley having a loose flexible encircling band, weights located between the band and pulley, adapted to be acted upon by centrifugal action to yieldingly hold the band expanded, and means for preventing the shifting of the weights and band.

12. A friction driving pulley having a loose flexible encircling band, weights located between the band and pulley, adapted to be acted upon by centrifugal action to yieldingly hold the band expanded, and means for preventing the shifting of the weights and band comprising a circumferential groove in the pulley within which the weights are seated and one or more abutments projecting from the periphery of the pulley into the band.

13. A friction driving pulley having a loose flexible encircling band and a plurality of segmental weights having a sharper curve than the periphery of the pulley, said weights being adapted to be thrown out by centrifugal action to hold the band expanded.

14. A friction driving pulley having a loose flexible encircling band and a plurality of segmental weights having a sharper curve than the periphery of the pulley, said weights being adapted to be thrown out by centrifugal action to hold the band expanded, and means for preventing the shifting of the weights and band.

15. A friction driving pulley having a centrifugal groove, a loose flexible encircling band and a plurality of segmental weights having a sharper curve than the periphery of the pulley, the ends of said weights being seated in said groove, the weights being adapted to be thrown out by centrifugal action to hold the band expanded.

16. A friction driving pulley having a centrifugal groove, a loose flexible encircling band and a plurality of segmental weights having a sharper curve than the periphery of the pulley, the ends of said weights being seated in said groove, the weights being adapted to be thrown out by centrifugal action to hold the band expanded, and means for preventing the shifting of the weights and band.

In testimony that I claim the foregoing as my invention, I have signed my name this 23d day of August, 1921.

EUGENE ATWOOD.